J. W. F. HOW.

Animal-Trap.

No. 113,168.

Patented Mar. 28, 1871.

Witnesses.

Inventor,
James W. F. How
by J. McC. Perkins
Atty.

UNITED STATES PATENT OFFICE.

JAMES WILLIAM FISHBACK HOW, OF DOUGLAS COUNTY, OREGON.

IMPROVEMENT IN ANIMAL-TRAPS.

Specification forming part of Letters Patent No. 113,168, dated March 28, 1871.

*To all whom it may concern:*

Be it known that I, JAMES WILLIAM FISHBACK HOW, of the county of Douglas and State of Oregon, have invented a new and useful Improvement in Animal-Traps; and I do hereby declare the following to be a full, clear, and exact description of the same, reference being had to the accompanying drawing, in which—

Figure 1:
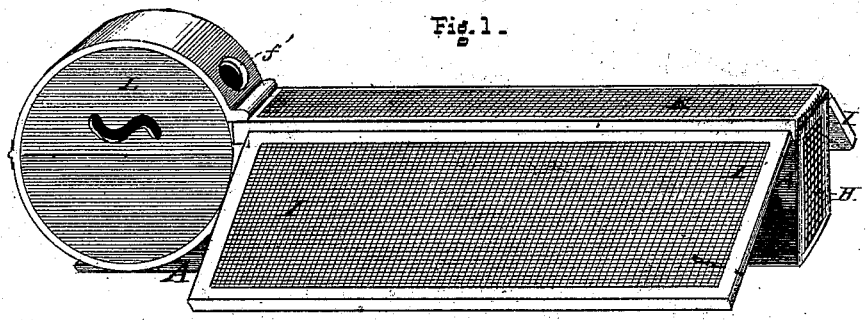
Figure 2:
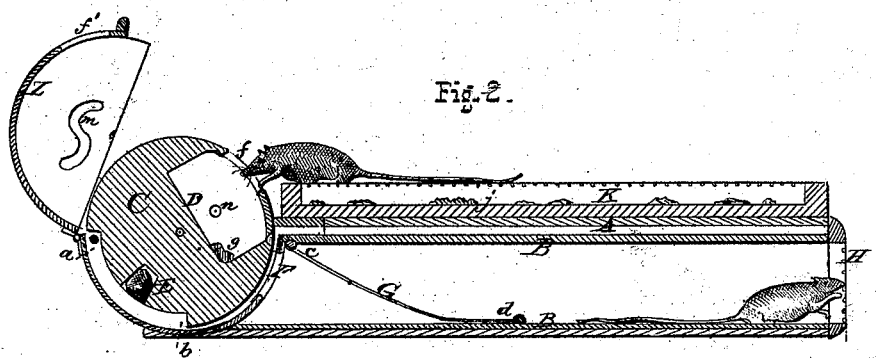
Figure 3:
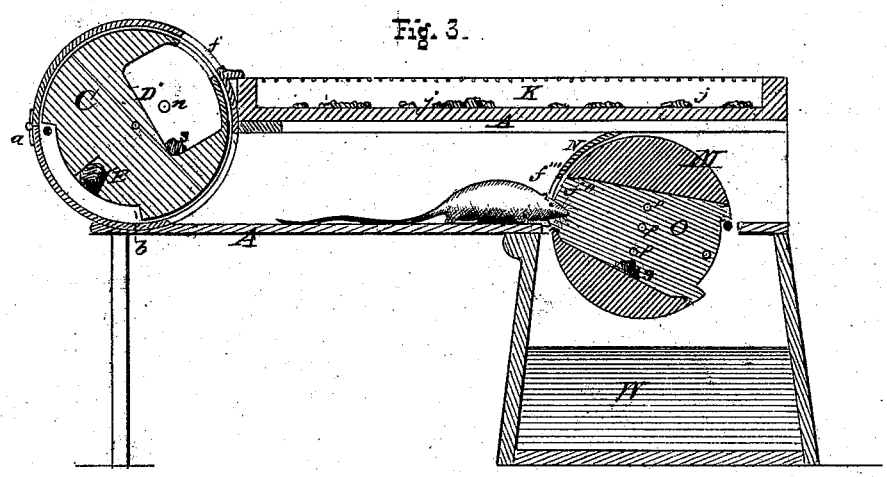

Figure 1 is a perspective view of the trap in readiness for operation. Fig. 2 is a longitudinal section of the trap, showing the animal approaching the catching-wheel, in which is deposited the bait. Fig. 3 is a section of the trap, showing a modification of the apparatus provided with a dumping-wheel and receptacle containing water for drowning the animal after capture.

The object of my invention is to provide a means for capturing animals and securing them alive, or, by a modification of the apparatus, to destroy them after capture.

To enable others to construct and operate my invention, the following full and exact description is appended, the several parts being referred to by the figures and letters represented on the accompanying drawing.

A is a long box, square or rectangular in section, containing a sliding drawer, B, capable of being withdrawn, and which is the receptacle containing the animal after capture. At one end of the box is placed the wheel C, of sufficient dimensions to contain a cavity, D, large enough to admit one or more animals.

The bait $g$ is placed at the lower point of the cavity, where it will be out of reach from the entrance.

The wheel C is hung upon an axis, around which it freely turns, which axis is placed on a level with the top of the box A. The counterbalance E keeps the wheel in position when ready for operation, and the bar $a''$ restricts its movements when in action.

Upon the entrance of the animal his weight causes it to revolve to the extent of about one-third its circumference, or from $a$ to $b$, bringing the mouth of the cavity D opposite the entrance F to the drawer B, into which the animal is thrown or dropped, upon which the wheel, relieved of his weight, turns back upon its axis to its original position, ready for another victim.

The drawer B is provided with an inclined wire screen or gate, G, hinged at its upper end, $c$, in such a manner as to be easily raised when the animal passes under its lower edge, $d$, into the other end of the drawer, whence it cannot escape, but can be seen through the grating H by other animals which may be attracted to the trap.

For the purpose of enticing the animals, the shallow boxes or bait-holders I and K, covered by wire screens, are provided with bait $j$, securely fastened to the bottom, so as to be out of reach, but in sight. These also furnish a ready access to the top of the trap when inclined against its sides, as represented in Fig. 1. The animal, being unable to reach the bait in the shallow boxes, will naturally seek entrance at the hole $f$ in the catching-wheel C, where he is tempted by the bait $g$ in the cavity D, which is beyond his reach, while he remains outside, but which will be obviously attainable by jumping into it—a measure likely to be adopted forthwith—and the capture effected by the means described.

In order to more surely effect this result, the cover L of the shell or case inclosing the catching-wheel has a hole, $f'$, made somewhat smaller than the aperture $f$, immediately over which it is situated when the trap is ready for service, as seen in Fig. 1. The edge of this forms a resting-place for the paws of the animal, and enables him to enter the cavity D without touching the edge of the hole $f$ of the wheel C, which would cause it to revolve partially, and thus, perhaps, deter him from entering.

The holes $m$ and $n$ are for the purpose of affording light and air to the cavity D.

The modified form of the trap, by which the animal is drowned after capture, is shown in Fig. 3. In this the drawer B is dispensed with, and a dumping-wheel, M, placed near the end of the box A, opposite the catching-wheel C, with its axis on a level with the bottom of the box. This wheel M is provided with a cavity, O, extending through the wheel, in order that it may be lighted from the end opposite the entrance-hole $f'''$.

The bait $g'$ is placed in a corresponding place to that in the catching-wheel, and wires $p\ p\ p$, one of which is the axis of the dumping-wheel, extend across the cavity, to keep the animal on the descending side when the wheel revolves. The cavity of this wheel at its entrance-hole $f''$ is provided with a shield, N, perforated with a hole, $f'''$, somewhat smaller than the hole $f''$, for the same purpose as that described for the catching-wheel.

Below the dumping-wheel M is placed the water receptacle or tank, W, which may be of any convenient dimensions, provided it be deep enough to prevent the escape of the animals by reaching upward after being immersed by falling from the wheel above.

The operation of the dumping-wheel M is precisely the same as that of the catching-wheel C, except that the animal is dropped into the water in the tank W, instead of into the drawer B.

Claims.

I claim as my invention—

1. The combination of the wheel C, with its several parts, with the drawer B and screen G, substantially as and for the purposes herein set forth.

2. The combination of the box A, containing the drawer B, and provided with the inclined and horizontal bait-holders I and K, with the wheel C and its several parts, substantially as and for the purposes herein set forth.

3. The combination of the box A, wheel C, inclined and horizontal bait-holders I K with the dumping-wheel M and water-receptacle W, substantially as and for the purposes hereinbefore described.

JAMES WILLIAM FISHBACK HOW.

Witnesses:
DANIEL JACKSON BOLLENBAUGH,
WILLIAM LINZY COLVIG.